US011736413B2

(12) United States Patent
Wang et al.

(10) Patent No.: US 11,736,413 B2
(45) Date of Patent: Aug. 22, 2023

(54) PROGRAMMABLE VIRTUAL NETWORK INTERFACE CONTROLLER (VNIC)

(71) Applicant: VMware, Inc., Palo Alto, CA (US)

(72) Inventors: Yong Wang, San Jose, CA (US); Boon Seong Ang, Saratoga, CA (US); Wenyi Jiang, Palo Alto, CA (US); Guolin Yang, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 224 days.

(21) Appl. No.: 17/149,760

(22) Filed: Jan. 15, 2021

(65) Prior Publication Data

US 2022/0231970 A1 Jul. 21, 2022

(51) Int. Cl.
*H04L 49/1546* (2022.01)
*H04L 69/22* (2022.01)
*H04L 49/00* (2022.01)
*H04L 9/06* (2006.01)
*H04L 9/40* (2022.01)
*H04L 45/7453* (2022.01)

(52) U.S. Cl.
CPC ........ *H04L 49/3063* (2013.01); *H04L 9/0643* (2013.01); *H04L 45/7453* (2013.01); *H04L 63/20* (2013.01); *H04L 69/22* (2013.01); *H04L 2212/00* (2013.01)

(58) Field of Classification Search
None
See application file for complete search history.

(56) References Cited

U.S. PATENT DOCUMENTS

| 9,864,538 | B1 * | 1/2018 | Johnson ................ G06F 3/0626 |
|---|---|---|---|
| 2008/0235690 | A1 * | 9/2008 | Ang ........................ G06F 9/546 718/102 |
| 2016/0226967 | A1 * | 8/2016 | Zhang ................. H04L 49/3063 |
| 2018/0083866 | A1 * | 3/2018 | Gobriel ................... H04L 45/64 |
| 2019/0140979 | A1 * | 5/2019 | Levi ..................... G06F 9/45558 |
| 2020/0167175 | A1 * | 5/2020 | Tsirkin ............... H04L 61/2514 |
| 2020/0403905 | A1 * | 12/2020 | Allen ..................... H04L 45/24 |

* cited by examiner

*Primary Examiner* — Duc T Duong
(74) *Attorney, Agent, or Firm* — Su IP Consulting (57) ABSTRACT

Example methods and systems for a programmable virtual network interface controller (VNIC) to perform packet processing are described. In one example, the programmable VNIC may modify a packet processing pipeline based on the instruction. The modification may include injecting a second packet processing stage among the multiple first packet processing stages of the packet processing pipeline. In response to detecting an ingress packet that requires processing by the programmable VNIC, the ingress packet may be steered towards the modified packet processing pipeline. The ingress packet may then be processed using the modified packet processing pipeline by performing the second packet processing stage (a) to bypass at least one of the multiple first processing stages, or (b) in addition to the multiple first processing stages.

21 Claims, 7 Drawing Sheets

PROGRAMMABLE VIRTUAL NETWORK INTERFACE CONTROLLER (VNIC)

BACKGROUND

Virtualization allows the abstraction and pooling of hardware resources to support virtual machines in a Software-Defined Networking (SDN) environment, such as a Software-Defined Data Center (SDDC). For example, through server virtualization, virtual machines (VMs) running different operating systems may be supported by the same physical machine (e.g., referred to as a "host"). Each VM is generally provisioned with virtual resources to run an operating system and applications. Further, through SDN, benefits similar to server virtualization may be derived for networking services. For example, logical overlay networks may be provisioned, changed, stored, deleted and restored programmatically without having to reconfigure the underlying physical hardware architecture. It is desirable to improve packet processing in the SDN environment to facilitate communication among endpoints, such as VMs, etc.

DETAILED DESCRIPTION

According to examples of the present disclosure, a packet processing pipeline on a programmable virtual network interface controller (VNIC) may be modified according to the desired network deployment requirement(s). In one example, the packet processing pipeline may be modified by injecting a second packet processing stage (e.g., "STAGE_N+1" in FIG. 1) among multiple first packet processing stages (e.g., "STAGE_1" to "STAGE_N" in FIG. 1). During packet processing, the second stage may be performed to bypass at least one of the multiple first stages. Alternatively, the second stage may be performed in addition to the multiple first stages. This way, instead of having to wait for a future release, the packet processing pipeline may be modified according to a particular data center user's requirement. Various examples will be discussed below.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
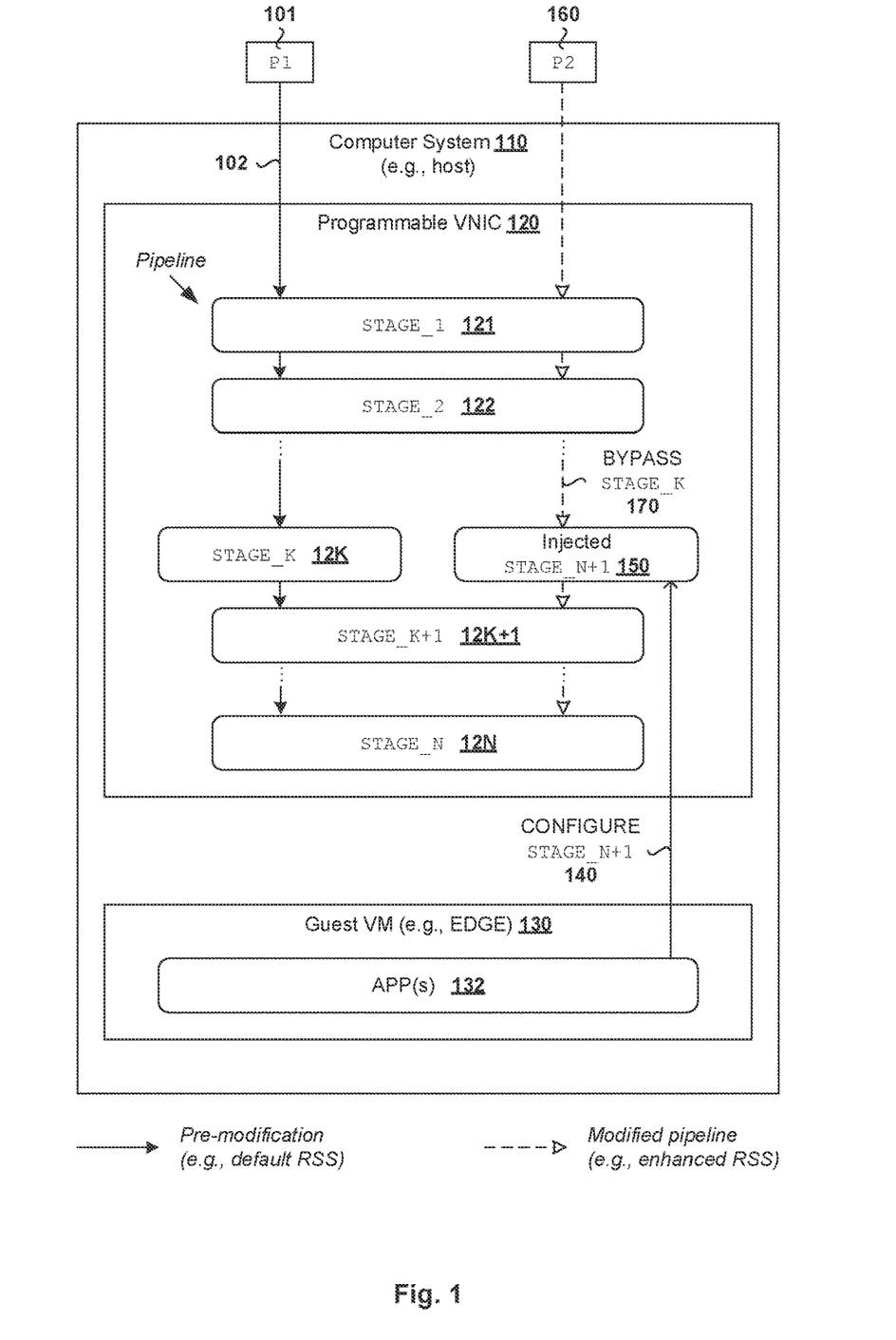
FIG. 1 is a schematic diagram illustrating an example computer system with a programmable virtual network interface controller (VNIC) for packet processing.

FIG. 1 is a schematic diagram illustrating example computer system 110 with a programmable VNIC for packet processing. In this example, computer system 110 may include programmable VNIC 120 to perform packet processing for guest virtual machine (VM) 130. Programmable VNIC 120 may be configured with a packet processing pipeline that includes multiple (N) packet processing stages. For example, according to a pre-configured pipeline (i.e., prior to any modification), an ingress packet (see "P1" 101) may be processed by STAGE_1 to STAGE_N (see 121-12N). If not blocked or dropped by any of the stages, the ingress packet is then forwarded towards guest VM 130 supporting any suitable application(s) 132.

Figure 2:
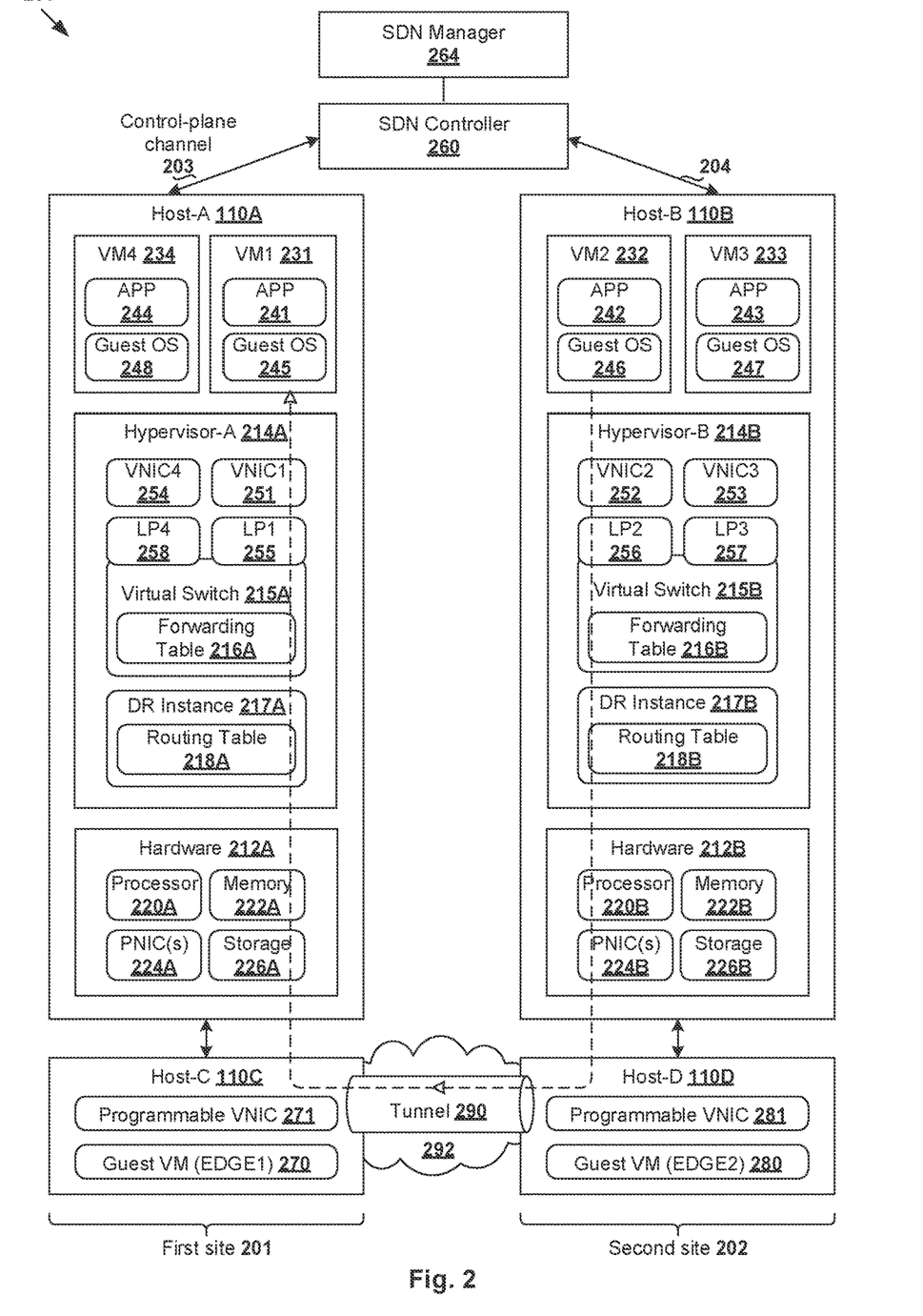
FIG. 2 is a schematic diagram illustrating an example software-defined networking (SDN) environment in which packet processing using a programmable VNIC may be performed.

In one example, computer system 110 in FIG. 1 may be host 110C/110D in FIG. 2 that supports guest VM 130 in the form of EDGE 270/280 that is deployed at one data center site to process packets travelling to/from another data center site. Throughout the present disclosure, EDGE 270/280 may be an entity that is implemented using one or more virtual machines (VMs) and/or physical machines (also known as "bare metal machines") and capable of performing functionalities of a switch, router, bridge, gateway, edge appliance, any combination thereof, etc. In practice, EDGE 270/280 may implement a centralized service router (SR) to provide networking services such as firewall, load balancing, network address translation (NAT), intrusion detection, deep packet inspection, etc.

In more detail, FIG. 2 is a schematic diagram illustrating example software-defined networking (SDN) environment 200 in which packet processing using a programmable VNIC may be performed may be performed. Depending on the desired implementation, SDN environment 200 may include additional and/or alternative components than that shown in FIG. 2. In practice, SDN environment 200 may include hosts 110A-D (also known as "computer systems," "computing devices", "host computers", "host devices", "physical servers", "server systems", "transport nodes," etc.). Note that each host may be supporting any number of virtual machines (VMs), such as tens or hundreds of VMs.

Each host 110A/110B in SDN environment 200 may include suitable hardware 212A/212B and virtualization software (e.g., hypervisor-A 214A, hypervisor-B 214B) to support various VMs. For example, hosts 110A-B may support respective VMs 231-234. Hardware 212A/212B includes suitable physical components, such as central processing unit(s) (CPU(s)) or processor(s) 220A/220B; memory 222A/222B; physical network interface controllers (PNICs) 224A/224B; and storage disk(s) 226A/226B, etc. In practice, SDN environment 200 may include any number of hosts (also known as a "host computers", "host devices", "physical servers", "server systems", "transport nodes," etc.), where each host may be supporting tens or hundreds of VMs.

Hypervisor 214A/214B maintains a mapping between underlying hardware 212A/212B and virtual resources allocated to respective VMs. Virtual resources are allocated to respective VMs 231-234 to each support a guest operating system (OS) and application(s); see 241-244 and 245-248. For example, the virtual resources may include virtual CPU, guest physical memory, virtual disk, virtual network interface controller (VNIC), etc. Hardware resources may be emulated using virtual machine monitors (VMMs). For example in FIG. 2, VNICs 251-254 are virtual network adapters for VMs 231-234, respectively, and are emulated by corresponding VMMs (not shown for simplicity) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" (L2) may refer generally to a link layer or media access control (MAC) layer; "layer-3" (L3) to a network or Internet Protocol (IP) layer; and "layer-4" (L4) to a transport layer (e.g., using Transmission Control Protocol (TCP), User Datagram Protocol (UDP), etc.), in the Open System Interconnection (OSI) model, although the concepts described herein may be used with other networking models.

Hypervisor 214A/214B implements virtual switch 215A/215B and logical distributed router (DR) instance 217A/217B to handle egress packets from, and ingress packets to, corresponding VMs. In SDN environment 200, logical switches and logical DRs may be implemented in a distributed manner and can span multiple hosts. For example, logical switches that provide logical layer-2 connectivity, i.e., an overlay network, may be implemented collectively by virtual switches 215A-B and represented internally using forwarding tables 216A-B at respective virtual switches 215A-B. Forwarding tables 216A-B may each include entries that collectively implement the respective logical switches. Further, logical DRs that provide logical layer-3 connectivity may be implemented collectively by DR instances 217A-B and represented internally using routing tables (not shown) at respective DR instances 217A-B. The routing tables may each include entries that collectively implement the respective logical DRs.

Packets may be received from, or sent to, each VM via an associated logical port. For example, logical switch ports 255-258 are associated with respective VMs 231-234. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 215A-B in FIG. 2, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

SDN controller 260 and SDN manager 264 are example network management entities in SDN environment 200. One example of an SDN controller is the NSX controller component of VMware NSX® (available from VMware, Inc.) that operates on a central control plane. SDN controller 260 may be a member of a controller cluster (not shown for simplicity) that is configurable using SDN manager 264 operating on a management plane. Network management entity 260/264 may be implemented using physical machine(s), VM(s), or both. Logical switches, logical routers, and logical overlay networks may be configured using SDN controller 260, SDN manager 264, etc. To send or receive control information, a local control plane (LCP) agent (not shown) on host 110A/110B may interact with SDN controller 260 via control-plane channel 203/204.

To facilitate communication between hosts 110A-B, EDGE1 270 on host-C 110C may be deployed at the edge of first site 201, and EDGE2 280 on host-D 110D at the edge of second site 202. In practice, hosts 110A-D may include similar components as hosts 110A-B, the details of which have been discussed above and not repeated here for brevity. Depending on the desired implementation, tunnel 290 may be established between a first tunnel endpoint at EDGE1 270 and a second tunnel endpoint at EDGE2 280. The second tunnel endpoint may be any other endpoint or non-edge router, not just EDGE2 280. Tunnel 290 may be established using any suitable tunneling protocol supported by EDGE1 270 and EDGE2 280. For example, a Virtual Private Network (VPN) based on Internet Protocol Security (IPSec) may bridge traffic between first site 201 (e.g., on-prem data center) and second site 202 (e.g., public cloud environment). In practice, IPSec is a secure network protocol suite that provides data authentication, integrity and confidentiality between a pair of entities (e.g., data centers, gateways) across an IP-based network. One example in the IPSec protocol suite is Encapsulating Security Payload (ESP), which provides origin authenticity using source authentication, data integrity and confidentiality through encryption protection for IP packets. Although various examples will be discussed using IPSec-based VPN, it should be understood that any alternative and/or additional protocol(s) may be used.

In the example in FIG. 2, EDGE1 270 and EDGE2 280 may facilitate various cross-site packet flows, such from source VM2 232 on host-B 110B to destination VM1 231 on host-A 110A (see dashed line). At second site 202, EDGE2 280 may perform transmit-side packet processing (e.g., encryption and encapsulation) on packets originating from VM2 232. At first site, EDGE1 270 may perform receive-side packet processing before forwarding (decrypted) packets towards destination VM1 231. Here, "receive-side processing" may involve decryption, decapsulation, encapsulation, firewall, load balancing, network address translation (NAT), intrusion detection or prevention system (IDS/IPS) operations, forwarding to destination, or any combination thereof. In one example, EDGE 270/280 may be implemented with Data Plane Development Kit (DPDK), which is an open-source Linux Foundation project that provides a set of data plane libraries and (physical or virtual) NIC drivers to accelerate fast packet processing.

Conventionally, packet processing at computer system 110 (e.g., EDGE 270/280) may lack efficiency and/or scalability. For example, computer system 110 may lack support for specific type(s) of receive-side scaling (RSS). For example, newer types of RSS may look into more packet header fields that are not supported by conventional NICs to further improve parallelism and reduce the likelihood of a bottleneck during packet processing. To upgrade computer system 110 with a particular RSS functionality, existing approaches generally require a vendor to program, test and make available the particular functionality at a future release. In some cases, the upgrade process may be delayed due to various reasons, such as lack of demand from other users, lower priority of a particular functionality compared to others, etc. Since different data center users generally have different requests that are specific to their respective deployments, the list of requests might become increasingly extensive and less manageable for the vendor. This may in turn increase the complexity and overhead associated with software and/or hardware upgrade process, which is undesirable.

Programmable VNIC

According to examples of the present disclosure, packet processing may be improved using programmable VNIC 120 with a packet processing pipeline that is modifiable to support new functionality. For example, programmable VNIC 120 might not support a particular functionality (e.g., a specific type of RSS implementation) required for a particular deployment environment. Instead of waiting for a future release that is usually designed to satisfy various functionality requests from different users, the packet processing pipeline may be modified (e.g., between product releases) to support additional and/or alternative networking functionalities. As used herein, the term "programmable VNIC" may refer generally to a VNIC with a modifiable packet processing pipeline.

Figure 3:
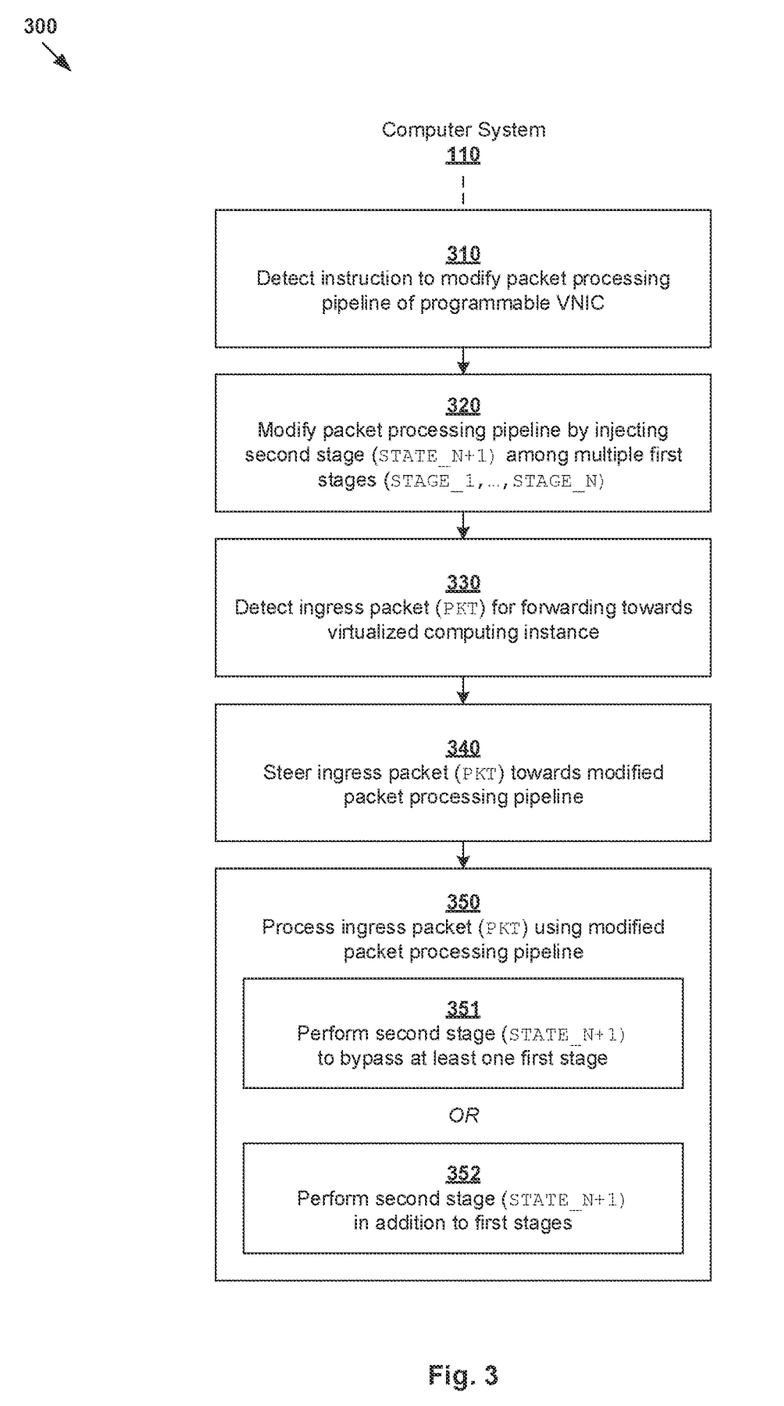
FIG. 3 is a flowchart of an example process for a programmable VNIC to perform packet processing.

In more detail, FIG. 3 is a flowchart of example process 300 for a programmable VNIC to perform packet processing. Example process 300 may include one or more operations, functions, or actions illustrated by one or more blocks, such as 310 to 352. The various blocks may be combined into fewer blocks, divided into additional blocks, and/or eliminated depending on the desired implementation. In the following, example process 300 will be explained using the example in FIG. 1. Examples of the present disclosure may be performed by any suitable "computer system" that includes programmable VNIC 120 with a packet processing pipeline, such as host 110C/110D supporting programmable VNIC 271/281 and "guest VM" in the form of EDGE 270/280. In practice, examples of the present disclosure may also be implemented by hosts 110A-B supporting respective programmable VNIC 251-254 and (trusted) guest VMs 231-234 while ensuring safe code injection into respective hypervisors 114A-B.

At 310 in FIG. 3, programmable VNIC 120 may detect an instruction to modify a packet processing pipeline. Using the example in FIG. 1, a packet processing pipeline of programmable VNIC 120 may be configured with "multiple first packet processing stages" denoted as STAGE_1 (see 121), STAGE_2 (see 122) to STAGE_N (see 12N). Prior to the modification, an ingress packet (see "P1" 101) may be processed using the first packet processing stages (see 102 in FIG. 2), particularly STAGE_1, then STAGE_2, then STAGE_3, and so on until final STAGE_N is reached.

At 320 in FIG. 3, based on the instruction (see 140), programmable VNIC 120 may modify the packet processing pipeline by injecting a "second packet processing stage" denoted as STAGE_N+1 (see 150) among STAGE_1 to STAGE_N (see 121-12N). In the example in FIG. 1, STAGE_N+1 may be injected before a particular STAGE_K−1 using any suitable K∈{2, . . . , N}. Depending on the desired implementation, the instruction (see 140 in FIG. 1) may be detected from guest VM 130 that is supported by computer system 110 and connected with programmable VNIC 120. The instruction is to cause programmable VNIC 120 to inject executable code associated with STAGE_N+1 150. For security reasons, programmable VNIC 120 may support restricted programmability in that "trusted" guest VM 130 is allowed to modify the packet processing pipeline. An example "trusted" guest VM 130 would be a VM that is developed by a vendor itself. This way, not all VMs (e.g., developed by a third party) will be allowed to initiate the modification.

At 330 and 340 in FIG. 3, in response to detecting an ingress packet (see "P2" 160 in FIG. 1), programmable VNIC 120 may steer the ingress packet towards the modified packet processing pipeline. This way, at 350, the ingress packet may be processed using the modified packet processing pipeline. In one example, at 351, injected second stage 150 (i.e., STAGE_N+1) may be performed to bypass at least one of first stages 121-12N, such as STAGE_K as shown at 170 in FIG. 1. This example will be discussed using FIGS. 5-6 in relation to receive-side scaling (RSS) implementation. Alternatively, at 352, injected second stage 150 (i.e., STAGE_N+1) may be performed in addition to the first stages 121-12N. This alternative will be discussed using FIG. 7.

In practice, newly injected STAGE_N+1 may be configured to perform any suitable packet processing functionality, such as RSS (to be discussed using FIGS. 5-6), packet filtering, security policy implementation, packet header and/or payload information modification, flow monitoring, support for particular protocol(s), etc. Using examples of the present disclosure, restricted programmability may be added to VNIC emulation to allow trusted guest VM 130 to inject code to change the behavior of a packet processing pipeline. This provides more flexibility with respect to functionality upgrade of programmable VNIC 120 to improve packet processing implementation.

Detailed Example

Figure 4:
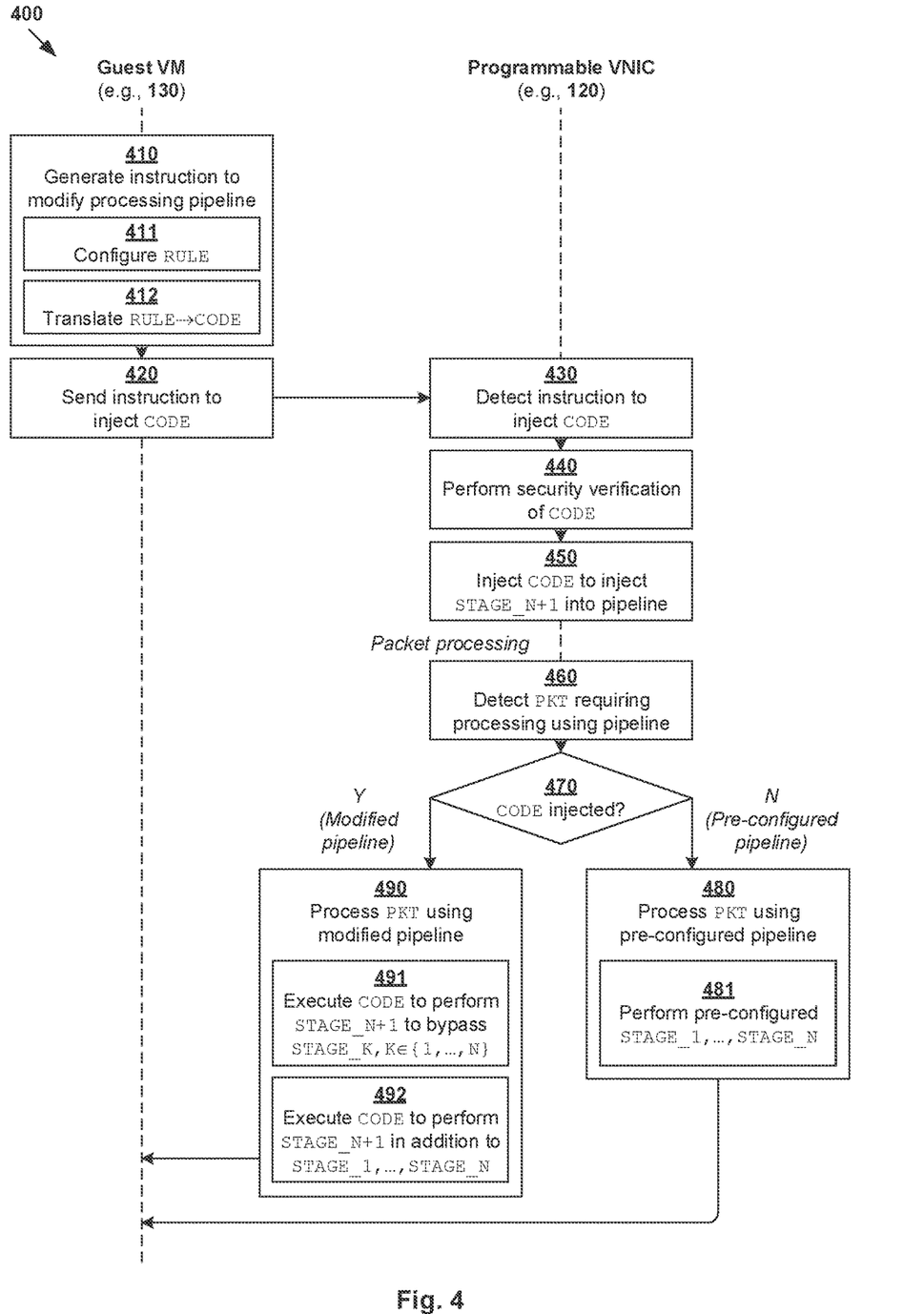
FIG. 4 is a flowchart of an example detailed process for a programmable VNIC to perform packet processing.

FIG. 4 is a flowchart of example detailed process 400 for a network device to perform receive-side processing for encapsulated encrypted packets in SDN environment 200. Example process 400 may include one or more operations, functions, or actions illustrated by one or more blocks, such as 410 to 492. The various blocks may be combined into fewer blocks, divided into additional blocks, and/or eliminated depending on the desired implementation. The example in FIG. 4 will be explained using FIG. 5, which is a schematic diagram illustrating first example 500 of packet processing by programmable VNIC 120.

(a) Code Injection

Figure 5:
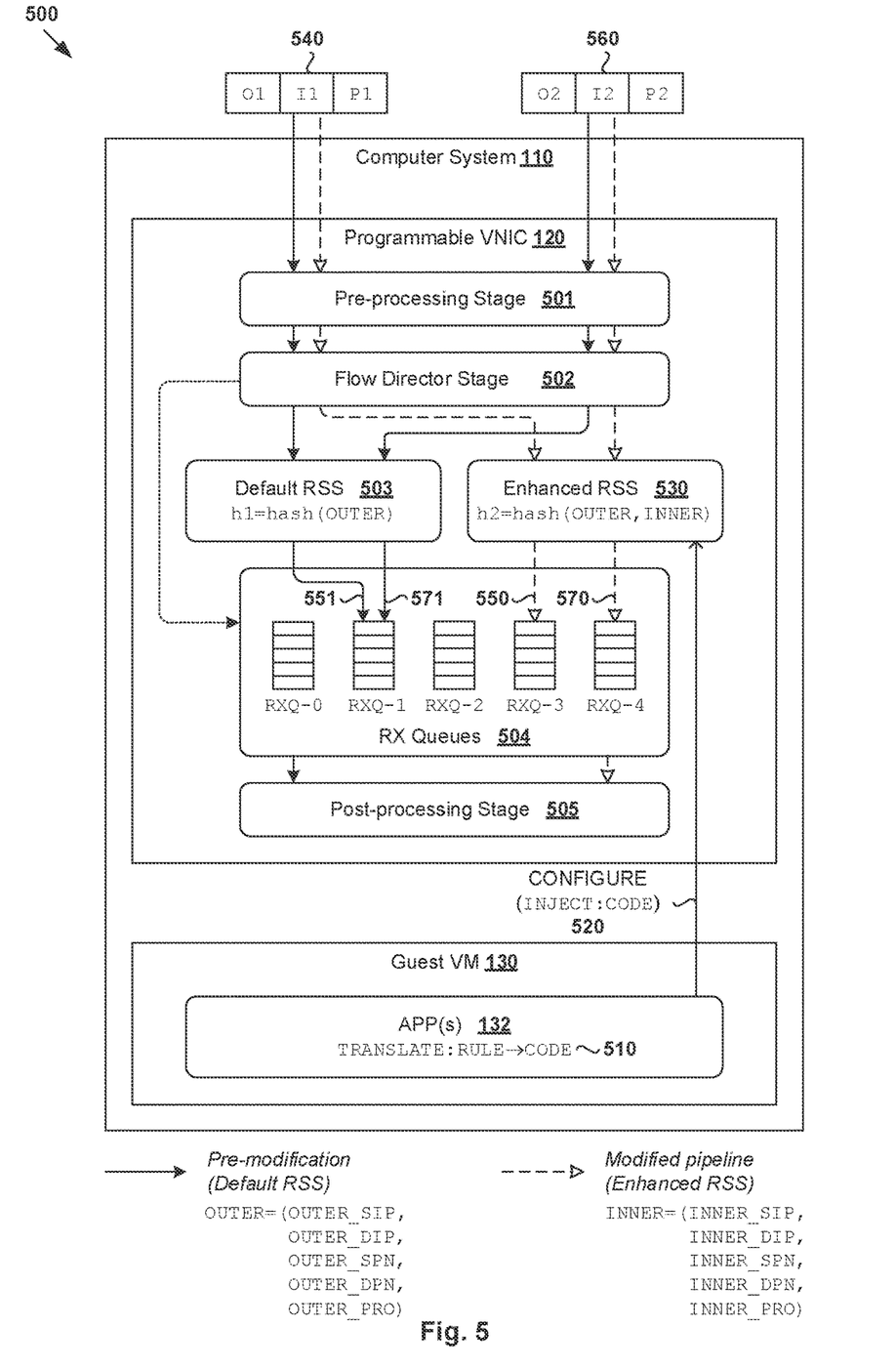
FIG. 5 is a schematic diagram illustrating a first example of packet processing by a programmable VNIC.

At 510 in FIG. 5, guest VM 130 may generate and send an instruction to modify a packet processing pipeline of programmable VNIC 120. The instruction may be used to initiate code injection by guest VM 130, such as according to a flow-based packet filtering framework. In one example, the framework may be based on the Berkeley Packet Filter (BPF), which allows a user-space application such as APP 132 running on VM 130 to attach a packet filter on a socket to allow or disallow certain types of packets to pass through the socket. Any suitable BPF version may be used, such as classical BPF (cBPF), extended BPF (eBPF), etc.

Compared with cBPF, eBPF uses an expanded set of registers and instructions for packet filtering. For security reasons, cBPF may be supported instead of eBPF, which might have security vulnerabilities such as side-channel attacks. Depending on the desired implementation, the code injection instruction from guest VM 130 may be generated by translating packet filtering rule(s) into executable code (e.g., BPF code). In one example, the BPF code may be converted into native code and executable function(s). Alternatively, the BPF code may be executed directly, such as by calling a BPF function. See 410-412 and 420 in FIG. 4.

(b) Modified RSS Implementation

At 520 in FIG. 5, based on the instruction from guest VM 130, programmable VNIC 120 may perform code execution to modify its packet processing pipeline. Depending on the desired implementation, any suitable security verification (e.g., code safety check) and optimization (e.g., logic optimization) may be performed prior to modifying the packet processing pipeline. See 430, 440 and 450 in FIG. 4.

Prior to the modification, example programmable VNIC 120 in FIG. 5 may support N=5 packet processing stages 501-505. Pre-processing stage 501 may include cryptography operations (e.g., decryption), header decapsulation, packet parsing to extract packet header and/or payload information, etc. Flow director stage 502 may involve matching a packet to one of multiple flow director rules. If there is a match, directing the packet to a particular packet queue, such as default queue labelled "RXQ-0" at 504. Otherwise (no match), the packet is directed to default RSS stage 503 (also called hash-based filtering stage), which may involve calculating a hash value based on the content of a packet. Based on the hash value, the packet may be assigned to one of multiple receive (RX) queues supported by packet queueing stage 504, such as "RXQ-1" to "RXQ-4." Post-processing stage 505 may represent the rest of the pipeline, which is usually application-specific.

In the example in FIG. 5, the instruction from guest VM 130 is to inject a new stage to enhance RSS implementation, such as to replace default RSS stage 503 with enhanced RSS stage 530. In this case, programmable VNIC 120 may expose a new type of RSS implementation that may be disabled or enabled by guest VM 130 according to the specific use case. Conventionally, default RSS stage 503 may calculate a hash value (h1) based on outer header information of an ingress encapsulated packet, such as 5 tuples=(OUTER_SIP, OUTER_DIP, OUTER_SPN, OUTER_DPN, OUTER_PRO). Here, OUTER_DIP=outer source IP address, outer OUTER_DIP=destination IP address, OUTER_SPN=outer source port number (PN), OUTER_DPN=outer destination PN and OUTER_PRO=outer protocol. Any suitable tunnel encapsulation may be used, such as GENEVE, etc. Since different packet flows that are transported between the same pair of tunnel endpoints may result in the same hash value, different packet flows may be assigned to the same packet queue, which lacks parallelism. See 480 and 481 in FIG. 4.

To improve parallelism and packet processing performance, enhanced RSS stage 530 may be configured to calculate a hash value based on both outer header information and inner header information. For example, the hash value (h2) may be calculated by applying a hash function on 10 tuples=(OUTER_SIP, OUTER_DIP, OUTER_SPN, OUTER_DPN, OUTER_PRO, INNER_SIP, INNER_DIP, INNER_SPN, INNER_DPN, INNER_PRO). Here, INNER_SIP=inner source IP address, INNER_DIP=inner destination IP address, INNER_SPN=inner source PN, INNER_DPN=inner destination PN and INNER_PRO=inner protocol. This way, different packet flows having different inner header information may be assigned to different packet queues for improved performance.

(c) Packet Processing

At 540 in FIG. 5, programmable VNIC 120 may detect a first ingress encapsulated packet denoted as (O1, I1, P1) that includes inner header information (I1) and payload information (P1) encapsulated with outer header information (O1). In response, the first encapsulated packet may be processed using a modified packet processing pipeline that includes enhanced RSS stage 530 to bypass default RSS stage 503. At 560, enhanced RSS stage 530 may calculate a hash value (h2) based on 10 tuples=(OUTER_SIP, OUTER_DIP, OUTER_SPN, OUTER_DPN, OUTER_PRO, INNER_SIP, INNER_DIP, INNER_SPN, INNER_DPN, INNER_PRO) extracted from the packet. Based on the hash value, the first encapsulated packet may be assigned to one of multiple RX queues supported by packet queueing stage 504, such as "RXQ-3."

Similarly, at 560 in FIG. 5, consider a second encapsulated packet denoted as (O2, I2, P2) that includes inner header information (I2) and payload information (P2) encapsulated with outer header information (O2). At 570, the second encapsulated packet may be assigned to a different packet queue, such as "RXQ-4." In this case, the second encapsulated packet is associated with a different set of 10 tuples compared to the first encapsulated packet. This results in a different hash value calculated by enhanced RSS stage 530. See also 490 and 491 in FIG. 4.

In practice, RX queues 504 may be associated with respective processing cores to facilitate parallel processing. Each "core" may be hardware-implemented (e.g., processors, CPU cores) and/or software-implemented (e.g., threads executed in parallel, virtual CPUs). The improved parallelism shown at 550/570 should be contrasted against the conventional approach of using default RSS stage 503, which might assign packets from different flows to the same queue denoted as "RXQ-1." See also 551, 571 in FIG. 5.

RSS Based on Security Information

Figure 6:
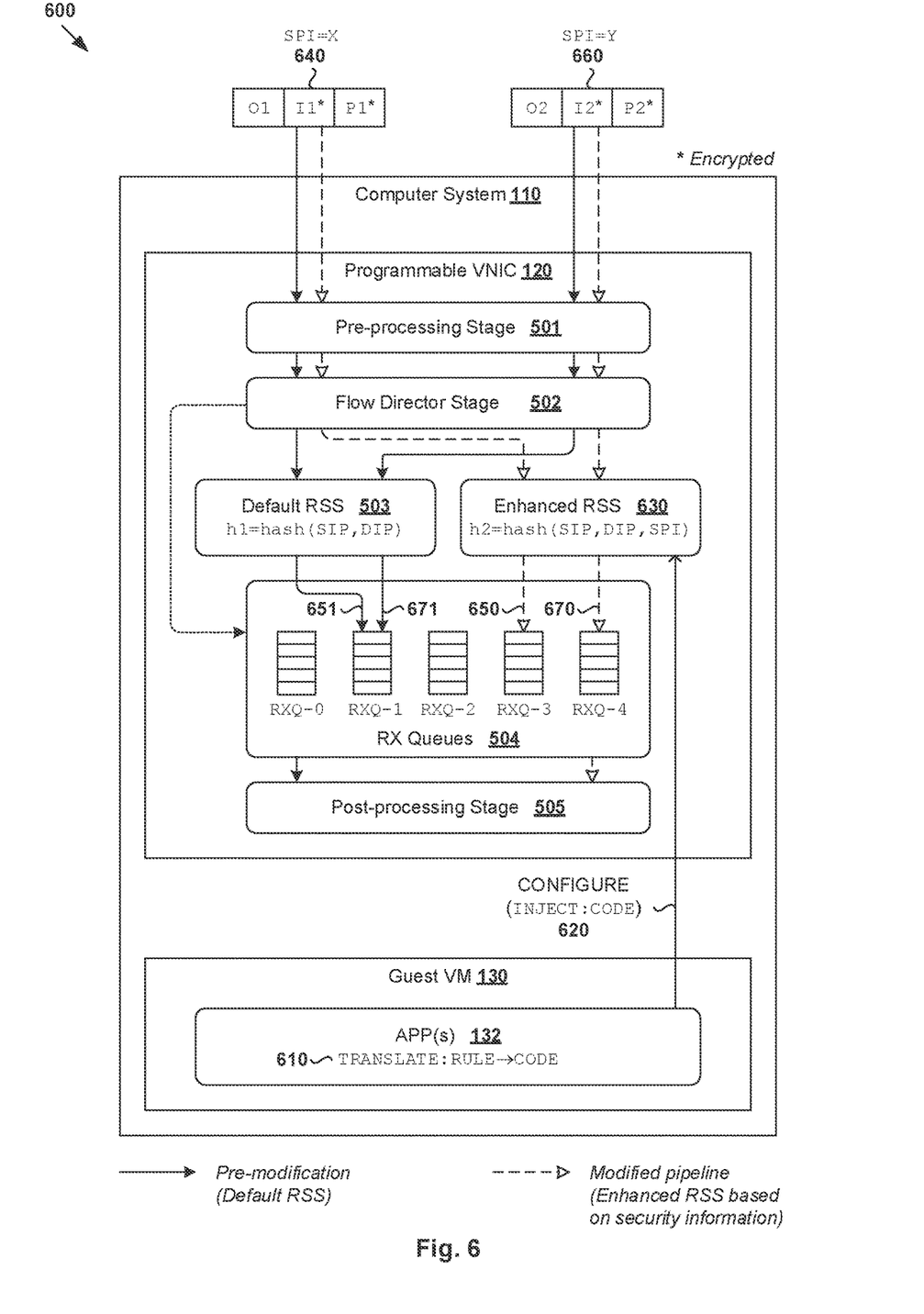
FIG. 6 is a schematic diagram illustrating a second example of packet processing by a programmable VNIC.

FIG. 6 is a schematic diagram illustrating second example 600 of packet processing by programmable VNIC 120. In the following, various implementation details explained using FIG. 5 are also applicable here and will not be repeated for brevity. The example in FIG. 6 may be implemented to support enhanced RSS, such as RSS based on security information in the form of a security parameter index (SPI) associated with a security association (SA). In practice, the term "security association" may refer generally to a form of contract between a pair of tunnel endpoints (e.g., implemented by respective EDGE1 270 and EDGE2 280) detailing how to exchange and protect information exchange between them.

Using IPSec for example, an SA may be uniquely identifiable using an SPI, source and destination address information, and a security protocol such as ESP. For example, during tunnel establishment, EDGE1 270 and EDGE2 280 in FIG. 2 may establish or negotiate an SA associated with tunnel 180 to specify various security attributes, such as cryptographic algorithms and keys. EDGE1 270 and EDGE2 280 may negotiate which algorithms to encrypt packets and to check for data integrity, such as advanced encryption standard (AES), secure hash algorithm (SHA), AES Galois/Counter mode (AES-GCM), etc. The SA may be established manually (i.e., static tunnel attributes) or dynamically (i.e., tunnel attributes negotiated in real time).

At the transmit side, EDGE2 280 may perform encryption and encapsulation for packets originating from a source endpoint at second site 202 (e.g., VM2 232) before forwarding encapsulated encrypted packets over tunnel 290. At the receive side, the reverse is performed. Based on the SA, EDGE1 270 to perform decryption and decapsulation before forwarding decrypted packets towards a destination endpoint (e.g., VM1 231). To identify the SA, an associated SPI may be added an identification tag to an outer header of each encapsulated encrypted packet travelling over tunnel 180. Each encapsulated encrypted packet may be padded with encryption-related data, such as ESP trailer and authentication data before being sent over tunnel 290. In practice, multiple SAs may be negotiated for a particular tunnel, or multiple tunnels, between EDGE1 270 and EDGE2 280.

Conventionally, a packet processing pipeline of programmable VNIC 120 may not support RSS based on SPI. In particular, default RSS stage 503 may calculate a hash value (h1) based on a pair of outer source IP address (SIP) and outer destination IP address (DIP), such as h1=hash(SIP, DIP). For encapsulated encrypted packets that are transported using the same pair of tunnel endpoints (e.g., EDGE1 270 and EDGE2 280 in FIG. 2), the packets may have the same hash value even though they are associated with different SAs and respective SPI=X (see 640) and SPI=Y (see 660). In this case, default RSS stage 503 may assign both packets to the same packet queue (see 651, 671), such as "RXQ-1" at packet queueing stage 504.

According to examples of the present disclosure, programmable VNIC 120 may modify the packet processing pipeline based on an instruction from guest VM 130 (see 610-620). In particular, enhanced RSS stage 630 may be injected to perform RSS based on security information by calculating hash value h2=hash(SIP, DIP, SPI). For encapsulated encrypted packets specifying different SPIs, enhanced RSS stage 630 may assign them to different packet queues.

This way, at 640-650 in FIG. 6, a first encapsulated encrypted packet with SPI=X is assigned to one queue="RXQ-3." At 660-670, a second encapsulated encrypted packet with SPI=Y is assigned to another queue="RXQ-4." Various examples relating to RSS for encapsulated encrypted packets have been described in a related U.S. patent application Ser. No. 16/893,450 entitled "Encapsulated encrypted packet handling for receive-side scaling (RSS)," the content of which is incorporated herein in its entirety.

Examples of the present disclosure may be implemented to implement any suitable type of RSS implementation that is not supported by conventional VNICs. Another example is RSS for GPRS Tunneling Protocol User Plane (GTPv1-U). To select a point at which a new stage is injected into a packet processing pipeline, hooks (e.g., hard-coded) may be used. For RSS implementation, the output may be a queue ID and the detailed algorithm may be reprogrammed. For the examples in FIGS. 5-6, it is also possible to implement multiple enhancements at the same stage, in which case with a combination of traffic, there is no need to reprogram VNIC 120. If it is desirable to support a new type of traffic at a later time, additional programming may be performed on top of all existing enhancements.

Add-on Functionality

Figure 7:
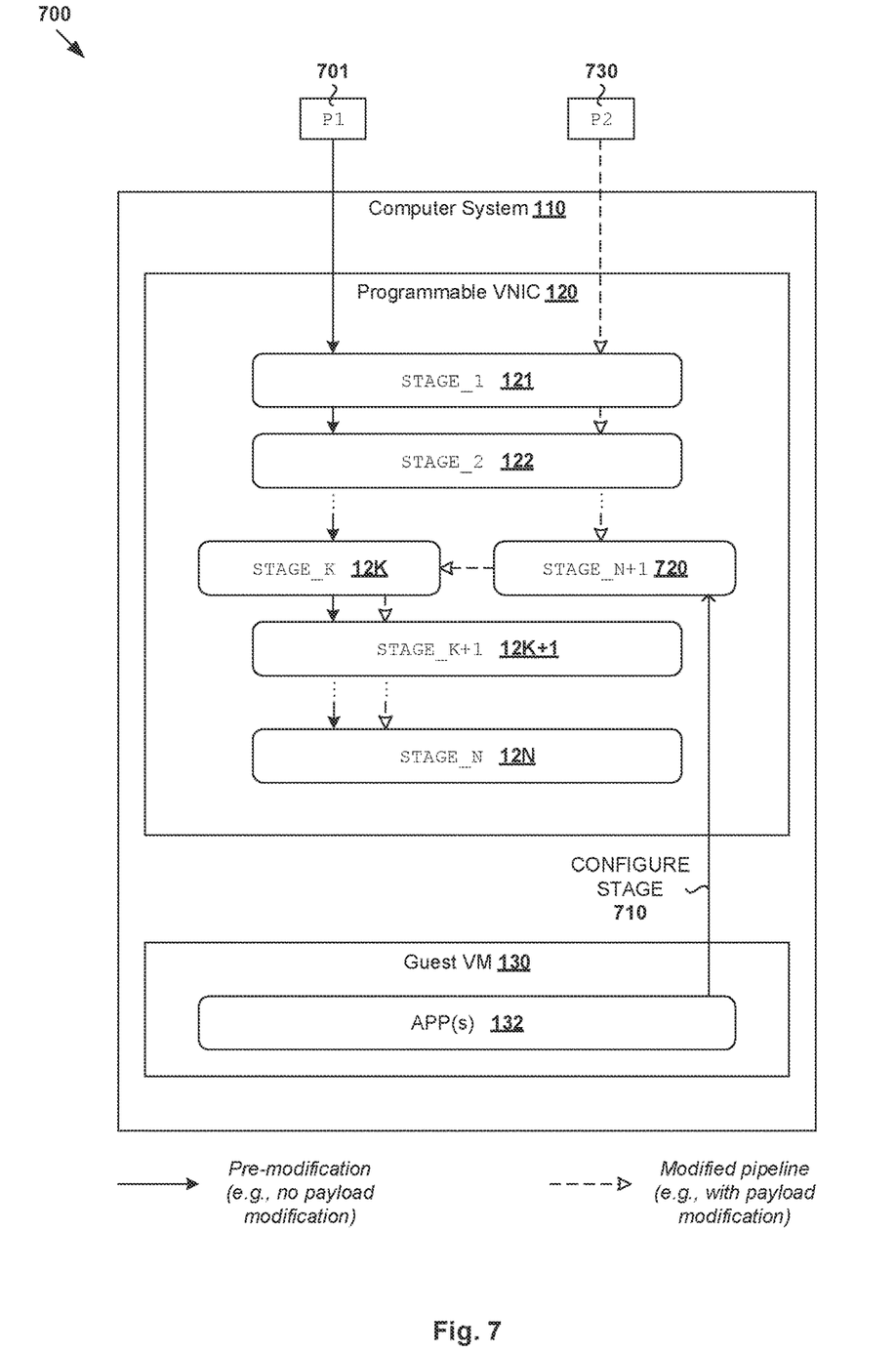
FIG. 7 is a schematic diagram illustrating a third example of packet processing by a programmable VNIC.

FIG. 7 is a schematic diagram illustrating third example 700 of packet processing by programmable VNIC 120. Similar to the examples in FIGS. 5-6, programmable VNIC 120 may modify the packet processing pipeline based on an instruction from guest VM 130 (see 710). In this example, STAGE_N+1 720 may be injected before STAGE_K 12K (where K∈{1, . . . , N}) as an "add-on" functionality. This way, during packet processing, an ingress packet (see "P2" 730) may be processed using the modified pipeline that includes STAGE_1 to STAGE_N (see 121-12N) in addition to newly injected STAGE_N+1 720 that is performed before STAGE_K 12K.

The example in FIG. 7 should be contrasted with the pre-configured pipeline that excludes STAGE_N+1 720 and used to process a prior ingress packet (see "P1" 701) before the modification. Depending on the desired implementation, STAGE_N+1 720 may be involve any one of the following: modifying header and/or payload information associated with an ingress packet, calculating or modifying metadata associated with the ingress packet, performing flow monitoring, performing packet filtering, performing operation(s) to support a protocol, applying security policy on the ingress packet, etc.

Container Implementation

Although discussed using VMs 231-234, it should be understood that receive-side processing for encapsulated encrypted packets may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 231, where a different VNIC is configured for each container. Each container is "OS-less", meaning that it does not include any OS that could weigh 11s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, computer system 110 capable of acting as EDGE1 270 or EDGE2 280 may be deployed in SDN environment 200.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

We claim:

1. A method for a programmable virtual network interface controller (VNIC) to perform packet processing, wherein the method comprises:
   detecting an instruction to modify a packet processing pipeline of the programmable VNIC, wherein the packet processing pipeline is configured with multiple first packet processing stages;
   based on the instruction, modifying the packet processing pipeline of the programmable VNIC by injecting a second packet processing stage among the multiple first packet processing stages; and
   in response to detecting an ingress packet that requires processing by the programmable VNIC,
   steering the ingress packet towards the modified packet processing pipeline that includes the second packet processing stage; and
   processing the ingress packet using the modified packet processing pipeline by performing the second packet processing stage (a) to bypass at least one of the multiple first processing stages, or (b) in addition to the multiple first processing stages.

2. The method of claim 1, wherein modifying the packet processing pipeline comprises:
   based on the instruction, modifying the packet processing pipeline by injecting executable code associated with the second packet processing stage.

3. The method of claim 1, wherein modifying the packet processing pipeline comprises:
   modifying the packet processing pipeline based on the instruction from an application running on a virtualized computing instance associated with the programmable VNIC, wherein the application is configured to translate a packet filtering rule to the executable code.

4. The method of claim 1, wherein modifying the packet processing pipeline comprises:
   injecting the second packet processing stage to modify the packet processing pipeline to support a receive side scaling (RSS) implementation.

5. The method of claim 4, wherein processing the ingress packet using the modified packet processing pipeline comprises:
   performing the second packet processing stage to calculate a hash value based on outer header information and inner header information extracted from the ingress packet, being an encapsulated packet.

6. The method of claim 4, wherein processing the ingress packet using the modified packet processing pipeline comprises:
   performing the second packet processing stage to calculate a hash value based on header information and security information extracted from the ingress packet, being an encapsulated encrypted packet.

7. The method of claim 1, wherein processing the ingress packet using the modified packet processing pipeline comprises:
   performing the second packet processing stage that includes one or more of the following: modifying header and/or payload information associated with the ingress packet, calculating or modifying metadata associated with the ingress packet, performing flow monitoring, performing packet filtering, performing one or more operations to support a protocol, and applying security policy on the ingress packet.

8. A non-transitory computer-readable storage medium that includes a set of instructions which, in response to execution by a processor of a computer system, cause the processor to perform packet processing using a programmable virtual network interface controller (VNIC), wherein the method comprises:
   detecting an instruction to modify a packet processing pipeline of the programmable VNIC, wherein the packet processing pipeline is configured with multiple first packet processing stages;
   based on the instruction, modifying the packet processing pipeline of the programmable VNIC by injecting a second packet processing stage among the multiple first packet processing stages; and
   in response to detecting an ingress packet that requires processing by the programmable VNIC, steering the ingress packet towards the modified packet processing pipeline that includes the second packet processing stage; and processing the ingress packet using the modified packet processing pipeline by performing the second packet processing stage (a) to bypass at least one of the multiple first processing stages, or (b) in addition to the multiple first processing stages.

9. The non-transitory computer-readable storage medium of claim 8, wherein modifying the packet processing pipeline comprises:

based on the instruction, modifying the packet processing pipeline by injecting executable code associated with the second packet processing stage.

10. The non-transitory computer-readable storage medium of claim 8, wherein modifying the packet processing pipeline comprises:

modifying the packet processing pipeline based on the instruction from an application running on a virtualized computing instance associated with the programmable VNIC, wherein the application is configured to translate a packet filtering rule to the executable code.

11. The non-transitory computer-readable storage medium of claim 8, wherein modifying the packet processing pipeline comprises:

injecting the second packet processing stage to modify the packet processing pipeline to support a receive side scaling (RSS) implementation.

12. The non-transitory computer-readable storage medium of claim 11, wherein processing the ingress packet using the modified packet processing pipeline comprises:

performing the second packet processing stage to calculate a hash value based on outer header information and inner header information extracted from the ingress packet, being an encapsulated packet.

13. The non-transitory computer-readable storage medium of claim 11, wherein processing the ingress packet using the modified packet processing pipeline comprises:

performing the second packet processing stage to calculate a hash value based on header information and security information extracted from the ingress packet, being an encapsulated encrypted packet.

14. The non-transitory computer-readable storage medium of claim 8, wherein processing the ingress packet using the modified packet processing pipeline comprises:

performing the second packet processing stage that includes one or more of the following: modifying header and/or payload information associated with the ingress packet, calculating or modifying metadata associated with the ingress packet, performing flow monitoring, performing packet filtering, performing one or more operations to support a protocol, and applying security policy on the ingress packet.

15. A computer system, comprising:
a processor;
a non-transitory computer-readable storage medium that includes a set of instructions, which in response to execution by the processor, cause the processor to implement a virtualized computing instance; and
a programmable virtual network interface controller (VNIC) to:
detect an instruction, from the virtualized computing instance, to modify a packet processing pipeline of the programmable VNIC, wherein the packet processing pipeline is configured with multiple first packet processing stages;

based on the instruction, modify the packet processing pipeline of the programmable VNIC by injecting a second packet processing stage among the multiple first packet processing stages; and in response to detecting an ingress packet that requires processing by the programmable VNIC,
steer the ingress packet towards the modified packet processing pipeline that includes the second packet processing stage; and
process the ingress packet using the modified packet processing pipeline by performing the second packet processing stage (a) to bypass at least one of the multiple first processing stages, or (b) in addition to the multiple first processing stages.

16. The computer system of claim 15, wherein the programmable VNIC is to modify the packet processing pipeline by performing the following:

based on the instruction, modify the packet processing pipeline by injecting executable code associated with the second packet processing stage.

17. The computer system of claim 15, wherein the programmable VNIC is to modify the packet processing pipeline by performing the following:

modify the packet processing pipeline based on the instruction from an application running on a virtualized computing instance associated with the programmable VNIC, wherein the application is configured to translate a packet filtering rule to the executable code.

18. The computer system of claim 15, wherein the programmable VNIC is to modify the packet processing pipeline by performing the following:

inject the second packet processing stage to modify the packet processing pipeline to support a receive side scaling (RSS) implementation.

19. The computer system of claim 18, wherein the programmable VNIC is to process the ingress packet using the modified packet processing pipeline by performing the following:

perform the second packet processing stage to calculate a hash value based on outer header information and inner header information extracted from the ingress packet, being an encapsulated packet.

20. The computer system of claim 18, wherein the programmable VNIC is to process the ingress packet using the modified packet processing pipeline by performing the following:

perform the second packet processing stage to calculate a hash value based on header information and security information extracted from the ingress packet, being an encapsulated encrypted packet.

21. The computer system of claim 15, wherein the programmable VNIC is to process the ingress packet using the modified packet processing pipeline by performing the following:

perform the second packet processing stage that includes one or more of the following: modifying header and/or payload information associated with the ingress packet, calculating or modifying metadata associated with the ingress packet, performing flow monitoring, performing packet filtering, performing one or more operations to support a protocol, and applying security policy on the ingress packet.

* * * * *